US011036413B1

(12) United States Patent
Sloat (10) Patent No.: US 11,036,413 B1
(45) Date of Patent: Jun. 15, 2021

(54) MEMORY SUB-SYSTEM TEMPERATURE REGULATION

(71) Applicant: Micron Technology, Inc., Boise, ID (US)

(72) Inventor: Jacob Sloat, Bloomington, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/717,460

(22) Filed: Dec. 17, 2019

(51) Int. Cl.
*G06F 3/06* (2006.01)
*G06F 1/20* (2006.01)

(52) U.S. Cl.
CPC ............ *G06F 3/0634* (2013.01); *G06F 1/206* (2013.01); *G06F 3/0617* (2013.01); *G06F 3/0679* (2013.01)

(58) Field of Classification Search
None
See application file for complete search history.

(56) References Cited

U.S. PATENT DOCUMENTS

| 7,191,088 | B1 * | 3/2007 | Reed ...................... G01K 7/425 374/100 |
| 10,031,677 | B1 | 7/2018 | Shallal et al. |
| 2003/0093641 | A1 * | 5/2003 | Kahn ................... G06F 9/30101 711/170 |
| 2004/0193822 | A1 * | 9/2004 | Kareenahalli ........... G06F 1/324 711/167 |
| 2004/0215371 | A1 * | 10/2004 | Samson ............. G05D 23/1919 700/299 |
| 2006/0190210 | A1 * | 8/2006 | Mukherjee ............. G01K 1/026 702/130 |
| 2006/0195708 | A1 | 8/2006 | Kato et al. |
| 2008/0228959 | A1 * | 9/2008 | Wang ..................... G06F 1/3225 710/22 |
| 2009/0190427 | A1 | 7/2009 | Brittain et al. |
| 2012/0224425 | A1 * | 9/2012 | Fai ....................... G11C 11/5642 365/185.09 |
| 2015/0255130 | A1 * | 9/2015 | Lee ..................... H04L 67/1097 711/103 |
| 2015/0301744 | A1 * | 10/2015 | Kim ...................... G06F 3/0634 711/103 |
| 2016/0342346 | A1 | 11/2016 | Byun et al. |
| 2018/0349243 | A1 * | 12/2018 | Shin ........................ G06F 1/206 |
| 2019/0004723 | A1 * | 1/2019 | Li ......................... G06F 12/0246 |
| 2019/0012263 | A1 * | 1/2019 | Jenne .................... G06F 3/0653 |
| 2019/0050147 | A1 | 2/2019 | Koo et al. |
| 2019/0073007 | A1 * | 3/2019 | Izumi .................... G06F 3/0614 |
| 2019/0107871 | A1 | 4/2019 | Sundaram et al. |

OTHER PUBLICATIONS

International Search Report and Written Opinion from related international application No. PCT/US2020/062119, dated Mar. 11, 2021, 10 pages.

* cited by examiner

*Primary Examiner* — J. H. Hur
(74) *Attorney, Agent, or Firm* — Brooks, Cameron & Huebsch, PLLC (57) ABSTRACT

A method includes determining, by a first component of a memory sub-system controller, a first temperature value of the memory subsystem controller. The method can further include determining, by a second component of a non-volatile memory device, a second temperature value of the non-volatile memory device coupled to the memory sub-system controller. The method can further include modifying a data parameter in response to at least one of the first temperature value or the second temperature value exceeding a threshold temperature value.

20 Claims, 6 Drawing Sheets

MEMORY SUB-SYSTEM TEMPERATURE REGULATION

TECHNICAL FIELD

Embodiments of the disclosure relate generally to memory sub-systems, and more specifically, relate to memory sub-system temperature regulation.

BACKGROUND

A memory sub-system can include one or more memory devices that store data. The memory devices can be, for example, non-volatile memory components and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to temperature regulation associated with a memory sub-system, in particular to memory sub-systems that include a temperature component. A memory sub-system can be a storage device, a memory module, or a hybrid of a storage device and memory module. An example of a memory sub-system is a storage system, such as a non-volatile dual in-line memory module (NVDIMM). Examples of storage devices and memory modules are described below in conjunction with FIG. 1. In general, a host system can utilize a memory sub-system that includes one or more components, such as "memory devices" that store data. The host system can provide data to be stored at the memory sub-system and can request data to be retrieved from the memory sub-system.

A non-volatile dual in-line memory module (NVDIMM) is a type of random-access memory that has volatile memory for normal operation and non-volatile memory in which to store the contents of the volatile memory if the power fails, using an on-board backup power source. A host, with respect to a memory unit, can be structured as one or more processors that control data in and out of the memory unit in response to instructions (e.g., an application, program, etc.) being executed by the host. In the event of a power failure, the NVDIMM can copy all the data from its volatile memory (e.g., DRAM or set of DRAMS) to its persistent flash storage and can copy all the data back to the volatile memory when power is restored. The transfer of the state of all the DRAM data into persistent data on the persistent flash storage can be performed on a power cycle. While example described above refers to a persistent flash storage, embodiments are not so limited. As an example, some embodiments can include persistent storage that is a non-flash persistent storage. The NVDIMM has its own battery backup power source or access to a dedicated power source to allow the NVDIMM to complete the save.

NVDIMMs can include a variety of different types (N, P, X, F). NVDIMM-N is a dual in-line memory module (DIMM) typically with flash storage and traditional dynamic random-access memory (DRAM) on the same module. A host processing unit can access the traditional DRAM directly. NVDIMM-P can include main memory that is persistent and can share a DDR4 or DDR5 DIMM interconnect with DRAM DIMMs. NVDIMM-X can include a DDR4 DIMM with NAND flash storage and volatile DRAM on a same module. NVDIMM-F can include an NVDIMM with flash storage.

In various embodiments, a set of control registers in a NVDIMM can be implemented to provide for a partial save of memory in the NVDIMM to non-volatile memory, where "memory" refers to the main memory of the NVDIMM. The main memory is the volatile memory, such as a DRAM, which stores user data. The set of control registers can provide a mechanism to conduct a partial save by containing a starting offset of a portion of the volatile memory to identify a location in the volatile memory where a save operation starts and by containing an amount of content of the volatile memory to be saved. A host can populate the set of control registers in the NVDIMM with an identification of a start of a save operation and an amount of content for the save operation. This set of control registers can also control the inverse operation that restores the partial save back to the volatile memory of the NVDIMM. This structure for maintaining data stored on a NVDIMM provides a host with added flexibility to handle user data with respect to applications for which the host is processing. The host is provided access to perform a full content or a partial content save at any offset. This can provide the host with the ability to have better control, and more control over what is saved and restored.

Whether a partial save/restore or a full save/restore is performed can have an affect on the temperature of a controller of the NVDIMM and/or the non-volatile memory of the NVDIMM. The temperature of a system (e.g., a controller, a non-volatile memory, etc.) can be important due to cooling costs, system use or placement, applications of the DIMM, damage of the DIMM due to increasing temperature or temperature that exceeds a maximum value, and use of NVDIMM in non-power failure events (e.g., when time of operation is less critical). The temperature of the controller and/or the non-volatile memory can be monitored and a maximum or threshold temperature of each of the controller and the non-volatile memory can determined or predetermined. In response to the temperature value of the controller or the non-volatile memory exceeding the threshold temperature value, operations to regulate temperature can be performed in order to bring the temperature value below the threshold temperature value.

By leveraging the save and/or partial save capabilities of the NVDIMM or dynamically altering data transfer speeds, embodiments herein can allow for control of system temperature using temperature components associated with an NVDIMM device. For example, temperature values of memory devices (e.g., volatile memory and/or non-volatile memory) associated with the NVDIMM can be sensed or monitored to maintain a temperature value below a threshold temperature value or within a range of temperature values using operations to regulate temperature described herein.

As described in more detail, herein, the operations to regulate temperature can be carried out using a temperature component that is resident on the NVDIMM. In some embodiments, the temperature component can be resident on a controller (e.g., a memory sub-system controller) associated with the NVDIMM or can be resident on a non-volatile memory device such as a flash memory device, cross-point memory device, etc. As used herein, the term "resident on" refers to something that is physically located on a particular component. For example, the temperature component being "resident on" the controller refers to a condition in which the temperature component is physically located on the controller. The term "resident on" can be used interchangeably with other terms such as "deployed on" or "located on," herein.

In some previous approaches, a save operation performed on data stored in a volatile memory device can include saving an entire portion of data to a non-volatile memory device and may not be able to dynamically adjust a size of the data saved in order to prevent a temperature value from exceeding a threshold temperature value. Likewise, a transfer speed of the data may not be dynamically adjustable in order to maintain a temperature value of the system within a particular range or below a particular threshold. A full save or restore of the data can cause a temperature of the controller and/or non-volatile memory to increase beyond user or server system limitations.

Aspects of the present disclosure address the above and other deficiencies by adjusting a size of data transferred or a transfer speed of the data to control a temperature of a controller and/or a temperature of the memory sub-system controller. An advantage of the present disclosure includes dynamically controlling the temperature of the controller and/or the memory-sub-system controller by adjusting characteristics of the data transfer (such as data size or data transfer speed). Embodiments described herein include a temperature component resident on the memory sub-system or the memory sub-system controller, to make it possible to perform operations (such as data size and/or data transfer speed adjustments) to adjust a temperature of a controller and/or a temperature of a non-volatile memory device. For example, because a temperature component can be provided resident on the memory sub-system and/or the memory sub-system controller, embodiments described herein can allow for the temperature component to monitor a temperature of a controller and adjust a data size (e.g., for saving the data into the non-volatile memory) in order to lower the temperature of the controller. Likewise, for example, embodiments described herein can allow for the temperature component to monitor a temperature of a controller and adjust a data transfer speed in order to lower the temperature of the controller. Further, as is described below, temperature measurements of both non-volatile memory and system (e.g., field programmable gate array (FPGA)) temperature can be continually monitored and the monitored values and a maximum value can be stored in registers of the FPGA.

Figure 1:
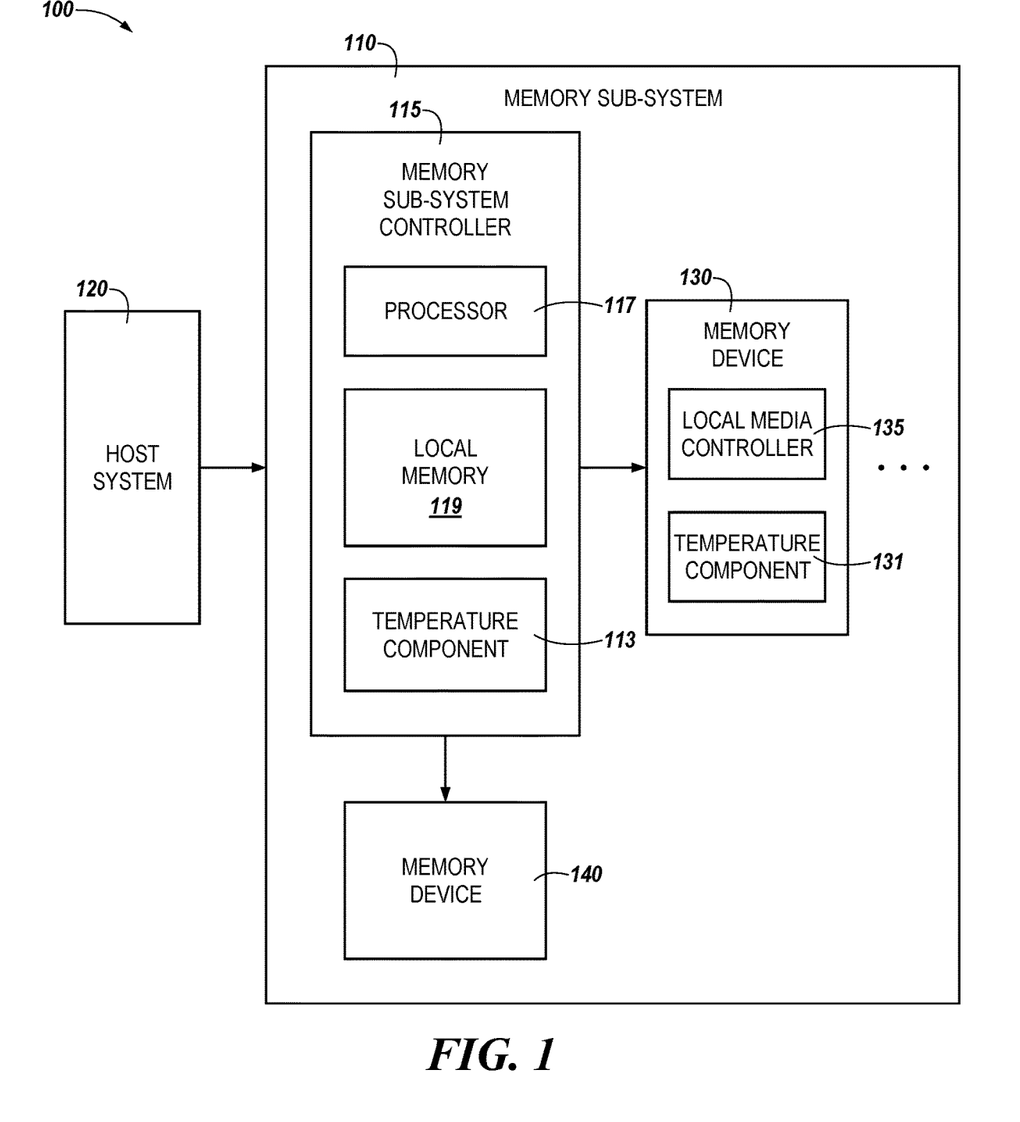
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of memory modules include a dual in-line memory module (DIMM), a small outline DIMM (SO-DIMM), and various types of non-volatile dual in-line memory modules (NVDIMM). Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include various combinations of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type memory (e.g., 2D NAND, 3D NAND) are described, the memory device 130 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a temperature component 113 that can be configured to orchestrate and/or perform operations to regulate temperature and communicate temperature data on various components, data paths, and/or interfaces of the memory sub-system 110. Although not shown in FIG. 1 so as to not obfuscate the drawings, the temperature component 113 can include various circuitry to facilitate grading and allocation of the sets of memory cells. For example, the temperature component 113 can include a special purpose circuitry in the form of an ASIC, FPGA, state machine, and/or other logic circuitry that can allow the temperature component 113 to orchestrate and/or perform temperature operations and communicate results to various components, data paths, and/or interfaces of the memory sub-system 110.

The memory sub-system controller 115 includes a temperature component 113 that can be configured to orchestrate and/or perform operations to regulate temperature on various components, data components, and/or interfaces of the memory sub-system 110. As an example, the temperature component 113 can sense and/or monitor a temperature value indicating a temperature of the memory sub-system controller 115. Although not shown in FIG. 1 so as to not obfuscate the drawings, the temperature component 113 can include various circuitry to facilitate grading and allocation of the sets of memory cells. For example, the temperature component 113 can include a special purpose circuitry in the form of an ASIC, FPGA, state machine, and/or other logic circuitry that can allow the temperature component 113 to orchestrate and/or perform operations to regulate temperature on various components, data elements, and/or interfaces of the memory sub-system 110 and transfer the temperature value to other various components of the memory sub-system 110. The temperature component 113 can sense and/or monitor multiple temperature values over a period of time or at different time intervals and feed back the temperature values as a feedback loop to dynamically monitor and adjust the temperature values.

As described in more detail in connection with FIG. 2, and FIG. 3 the temperature component 113 can be communicatively coupled to the memory devices 130 and can access the memory device 130, the memory device 140, internal data paths of the memory sub-system 110, and/or interfaces of the memory sub-system 110 to perform the operations described herein and/or to transfer the temperature value data to additional elements of the memory sub-system 110. In some embodiments, the operations performed by the temperature component 113 can be performed during an initialization or pre-initialization stage of data transfer within the memory sub-system 110 and/or the memory sub-system controller 115. Accordingly, in some embodiments, the temperature component 113 can perform the operations described herein prior to data transfer in order to determine a size of data to transfer or a data transfer speed to initially perform. During the initial data transfer, additional temperature values can be obtained and the size of the data transferred or the data transfer speed can be adjusted in order to adjust the temperature values.

The memory device 130 includes a temperature component 131 that can be configured to orchestrate and/or perform operations to regulate temperature on the memory device 130. As an example, the temperature component 131 can sense and/or monitor a temperature value indicating a temperature of the memory device 130. Although not shown in FIG. 1 so as to not obfuscate the drawings, the temperature component 131 can include various circuitry to facilitate grading and allocation of the sets of memory cells. For example, the temperature component 131 can include a special purpose circuitry in the form of an ASIC, FPGA, state machine, and/or other logic circuitry that can allow the temperature component 131 to orchestrate and/or perform operations to regulate temperature on various components, data elements, and/or interfaces of the memory device 130 and transfer the temperature value to other various components of the memory sub-system 110. The temperature component 131 can sense and/or monitor multiple temperature values over a period of time or at different time intervals and feed back the temperature values as a feedback loop to dynamically monitor and adjust the temperature values of the memory device 130.

As described in more detail in connection with FIG. 2, and FIG. 3 the temperature component 131 can be communicatively coupled to the memory sub-system controller 115 and can access the memory sub-system controller 115, the memory device 140, internal data paths of the memory sub-system 110, and/or interfaces of the memory sub-system 110 to perform the operations described herein and/or to transfer the temperature value data to additional elements of the memory sub-system 110. In some embodiments, the operations performed by the temperature component 131 can be performed during an initialization or pre-initialization stage of data transfer from or to the memory device 130 and/or within the memory sub-system 110. Accordingly, in some embodiments, the temperature component 131 can perform the operations described herein prior to data transfer in order to determine a size of data to transfer or a data transfer speed to initially perform. During the initial data transfer, additional temperature values can be obtained and the size of the data transferred or the data transfer speed can be adjusted in order to adjust the temperature values.

The data generated by the temperature components 113 or 131 can be injected into a data path between the memory sub-system controller 115 and the memory device 140 or the memory device 130. The data can be a quantity of bits that corresponds to a specific bit pattern. For example, the data can be an Altera PHY Interface (AFI) bit pattern, a user control bit pattern, a bi-directional (DQ) pin control data pattern, or other suitable bit pattern that can be written to, and read from, a first memory device (or a memory device different than the first memory device). In some embodiments, the data can include a specific recurring set of alphanumeric characters such as a string of alternating ones and zeros or a quantity of ones (or zeros) followed by a quantity of zeros (or ones). It will be appreciated that embodiments are not limited to these enumerated examples and the data can include any pattern of bits and/or data that can be written to, and read from, one of the memory devices, etc.

The temperature component 113 can be configured to cause data to be injected into the data path such that the data is written to the second memory device using a particular size of data or a particular data transfer speed based on a temperature value determined by the temperature component 113. Likewise, the temperature component 131 can be configured to cause the data to be injected into the data path using a particular data size or a particular data transfer speed based on a temperature value determined by the temperature component 131. As described above, the data can be written to the second memory device as part of an operation to save the data to the second memory device or as part of an operation to perform a partial save operation using the second memory device.

In some embodiments, the temperature component 113 can generate a first indication in response to a determination that the temperature value of the memory sub-system controller 115 is approaching a temperature value threshold. The first indication can indicate to reduce a size of the data being transferred or decrease a data transfer speed in order to maintain a temperature value or reduce a temperature value. The reduction can be based on how close the temperature value is to the threshold temperature value or a margin of temperature value between the determined temperature value and the threshold temperature value. Likewise, a second indication can be generated indicating to maintain a data size or a data transfer speed. Further, a third indication can be generated indicating to increase a data size or a data transfer speed. The third indication can be generated in response to the temperature value being below the threshold temperature value by a particular margin amount. In this instance, the temperature value can be increased by increasing the data size or increasing the data transfer speed in order to increase the data transfer efficiency, decrease an amount of time it takes to transfer the data, etc.

Figure 2:
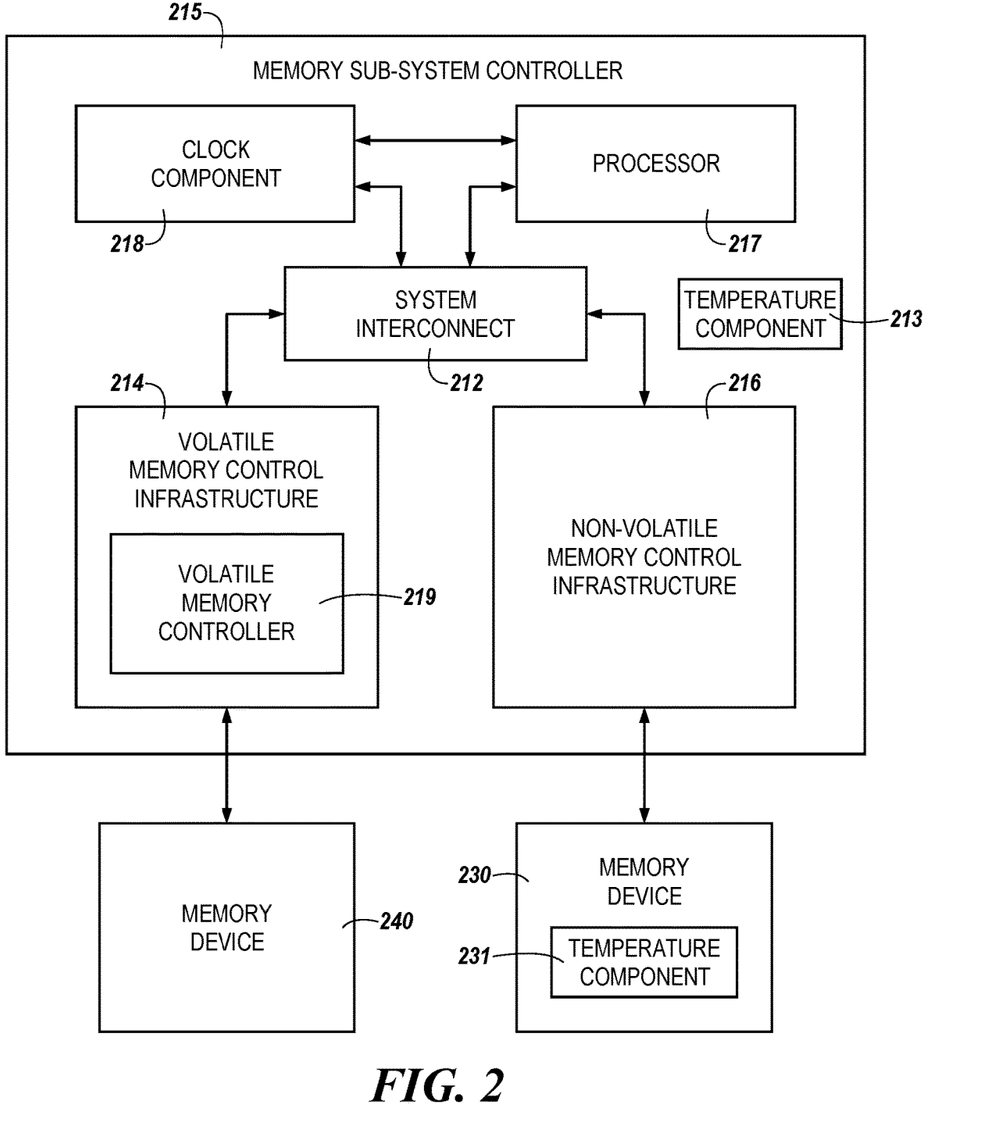
FIG. 2 illustrates an example of a memory sub-system controller and temperature component in accordance with some embodiments of the present disclosure.

FIG. 2 illustrates an example of a memory sub-system controller 215 and temperature component 213 in accordance with some embodiments of the present disclosure. The memory sub-system controller 215 can be analogous to the memory sub-system controller 115 illustrated in FIG. 1 and the temperature component 213 can be analogous to the temperature component 113 illustrated in FIG. 1. Further, the processor 217 can be analogous to the processor 117 illustrated in FIG. 1, the memory device 230 can be analogous to the memory device 130 illustrated in FIG. 1 and the memory device 240 can be analogous to the memory device 140 illustrated in FIG. 1. In addition to the temperature component 213, the processor 217, the memory device 230, and the memory device 240, the memory sub-system controller 215 can further include a clock component 218, a system interconnect 212, volatile memory control infrastructure 214, which can include a volatile memory controller 219, and non-volatile memory control infrastructure 216.

The clock component 218 can provide timing signals to the memory sub-system controller 215 to facilitate performance of memory operations orchestrated by the memory sub-system controller 215. In some embodiments, the clock component 218 can be a register clock driver that can be configured to buffer and/or re-drive commands and/or addresses to the memory device 230 and/or the memory device 240 during operation of the memory sub-system controller 215.

The system interconnect 212 can be a communication sub-system that can allow commands, signals, instructions, and the like to be passed between the processor 217, clock component 218, volatile memory control infrastructure 214, and the non-volatile memory control infrastructure 216. The system interconnect 212 can be a crossbar ("XBAR"), a network on a chip, or other communication subsystem that allows for interconnection and interoperability between the processor 217, clock component 218, volatile memory control infrastructure 214, and the non-volatile memory control infrastructure 216. For example, the system interconnect 212 can facilitate visibility between the processor 217, clock component 218, volatile memory control infrastructure 214, and the non-volatile memory control infrastructure 216 to facilitate communication therebetween. In some embodiments, communication between the processor 217, clock component 218, volatile memory control infrastructure 214, and the non-volatile memory control infrastructure 216 via the system interconnect 212 can be provided via respective data paths (shown by the arrows connecting the system interconnect 212 to the other components of the memory sub-system controller 215). These data paths can be used to share commands indicating to increase or decrease a data transfer size or a data transfer speed in response to changing temperature values obtained by the temperature component 213 and corresponding to the temperature of the memory sub-system controller 215 or obtained by the temperature component 231 of the memory device 230 (which indicates a temperature value of the memory device 230).

The volatile memory control infrastructure 214 can include circuitry to control data transfers between the memory device 230 and a host, such as the host system 120 illustrated in FIG. 1. For example, the volatile memory control infrastructure 214 can include various interfaces, direct media access components, registers, and/or buffers.

In the embodiment illustrated in FIG. 2, the temperature component 213 is resident on the memory sub-system controller 215 and the temperature component 231 is resident on the memory device 230. As described above, the temperature components 213, 231 can be configured to facilitate performance of operations of the memory sub-system controller 215 and/or a memory subsystem (e.g., the memory sub-system 110 illustrated in FIG. 1) in which the memory sub-system controller 215 is deployed. For example, the temperature components 213, 231 can be configured to adjust a data size to be transferred or a data transfer speed corresponding to a particular transfer of data (e.g., for performing a full or partial restore or save).

The temperature components 213, 231 can be further configured to affect timing information from the clock component 218 (e.g., generating an indication to increase or decrease a clock cycle signal associated with a frequency of data transfer), perform an operation to compare a frequency of a timing signal generated by the clock component to an expected timing signal, and determine, based on the comparison, whether the frequency of the timing signal and the expected timing signal are substantially equivalent. As used herein, the term "substantially" intends that the characteristic need not be absolute, but is close enough so as to achieve the advantages of the characteristic. For example, "substantially equivalent" is not limited to absolute equivalence, and can include slight variations in equivalence that can be due to manufacturing limitations and/or operational characteristics of the memory sub-system controller 215.

The non-volatile memory control infrastructure 216 can include circuitry to control data transfers between the memory device 240 and a host, such as the host system 120 illustrated in FIG. 1. For example, the volatile memory control infrastructure 214 can include various interfaces, direct media access components, registers, and/or buffers.

Figure 3:
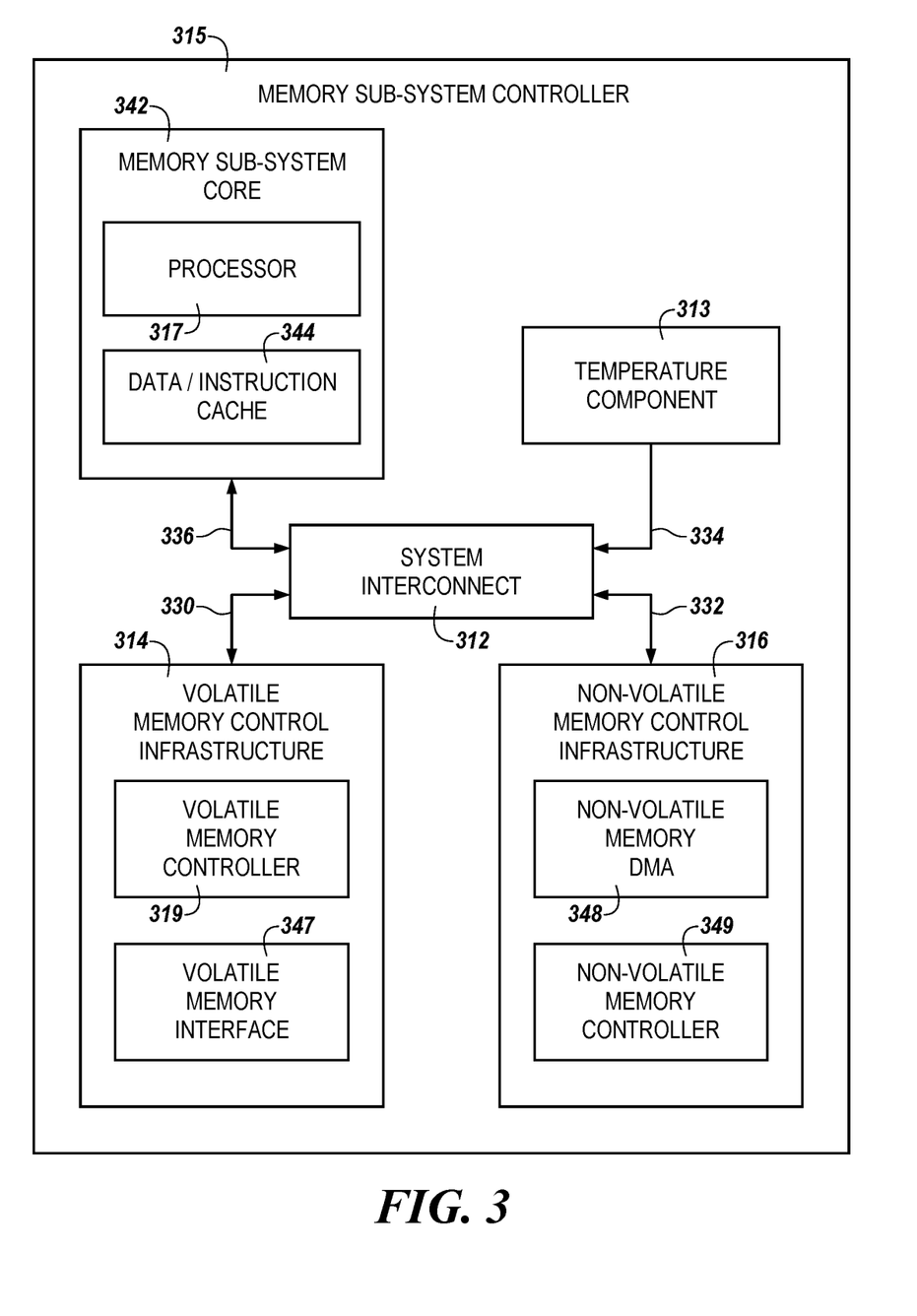
FIG. 3 illustrates another example of a memory sub-system controller and temperature component in accordance with some embodiments of the present disclosure.

FIG. 3 illustrates another example of a memory sub-system controller 315 and temperature component 313 in accordance with some embodiments of the present disclosure. The memory sub-system controller 315 can be analogous to the memory sub-system controller 215 illustrated in FIG. 2 and the temperature component 313 can be analogous to the temperature component 213 illustrated in FIG. 2. Further, the processor 317, the system interconnect 312, volatile memory control infrastructure 314, the volatile memory controller 319, and non-volatile memory control infrastructure 316 can be analogous to the processor 217, the system interconnect 212, volatile memory control infrastructure 214, the volatile memory controller 219, and non-volatile memory control infrastructure 216 illustrated in FIG. 2.

As shown in FIG. 3, the memory sub-system controller can further include a memory sub-system core 342, which can include the processor 317 and a data and/or instruction cache 344. In addition, the volatile memory control infrastructure 314 can include a volatile memory interface 447 and the volatile memory controller 319, which can include the temperature component 313. Further, the non-volatile memory control infrastructure 316 can include a non-volatile memory direct memory access (DMA) component 348 and a non-volatile memory controller 349.

The memory sub-system core 342 can be coupled to the system interconnect 312 via a data path 336, which can allow for commands, signals, data, and other information to be transferred between the memory sub-system core 342, the volatile memory control infrastructure 314, and the non-volatile memory control infrastructure 316. The memory sub-system core 342 can be a reduced instruction set computing (RISC) device such as a RISC-V device. In some embodiments, the memory sub-system core 342 can be a XILINX® MicroBlaze soft processor core, or other suitable processing core.

The volatile memory control infrastructure 314 can include a volatile memory controller 319, which can include the temperature component 313, and/or a volatile memory interface 347.

Figure 4A:
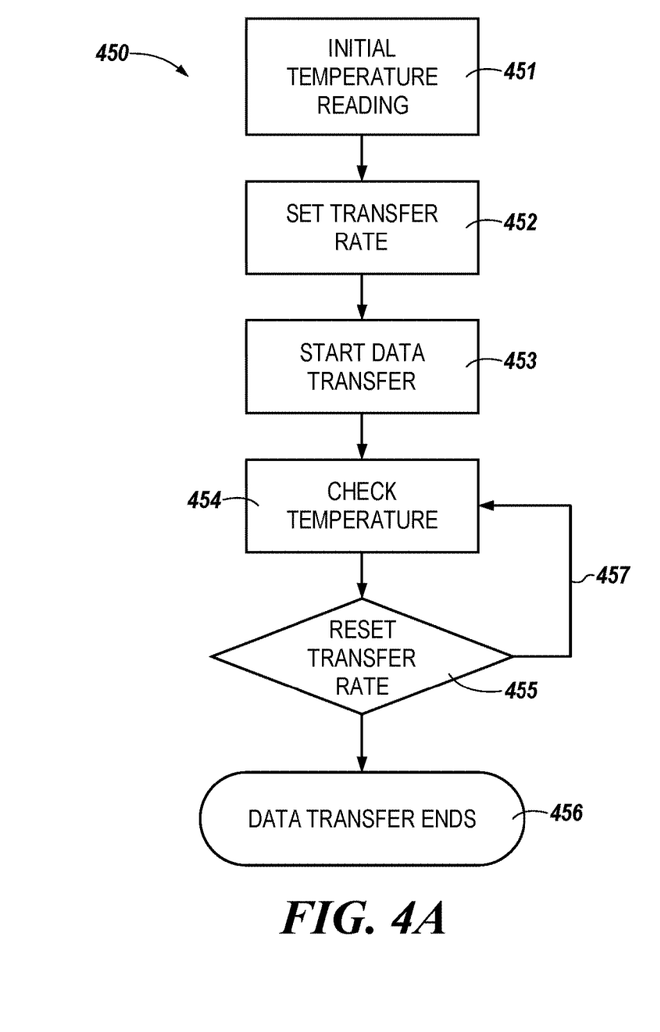
FIG. 4A illustrates a flow diagram corresponding to memory sub-system operations to regulate temperature in accordance with some embodiments of the present disclosure.
Figure 4B:
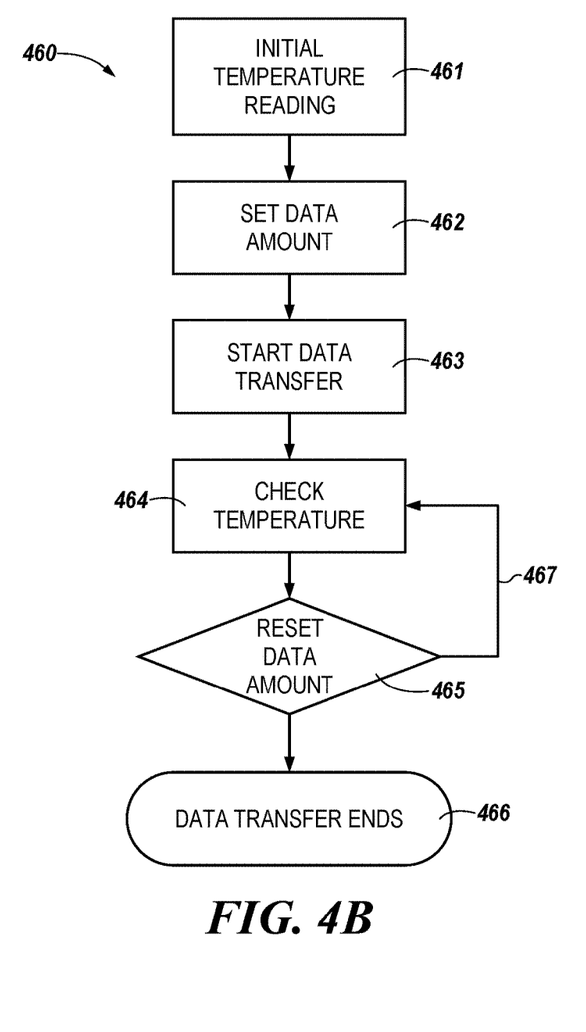
FIG. 4B illustrates a flow diagram corresponding to memory sub-system operations to regulate temperature in accordance with some embodiments of the present disclosure.
Figure 5:
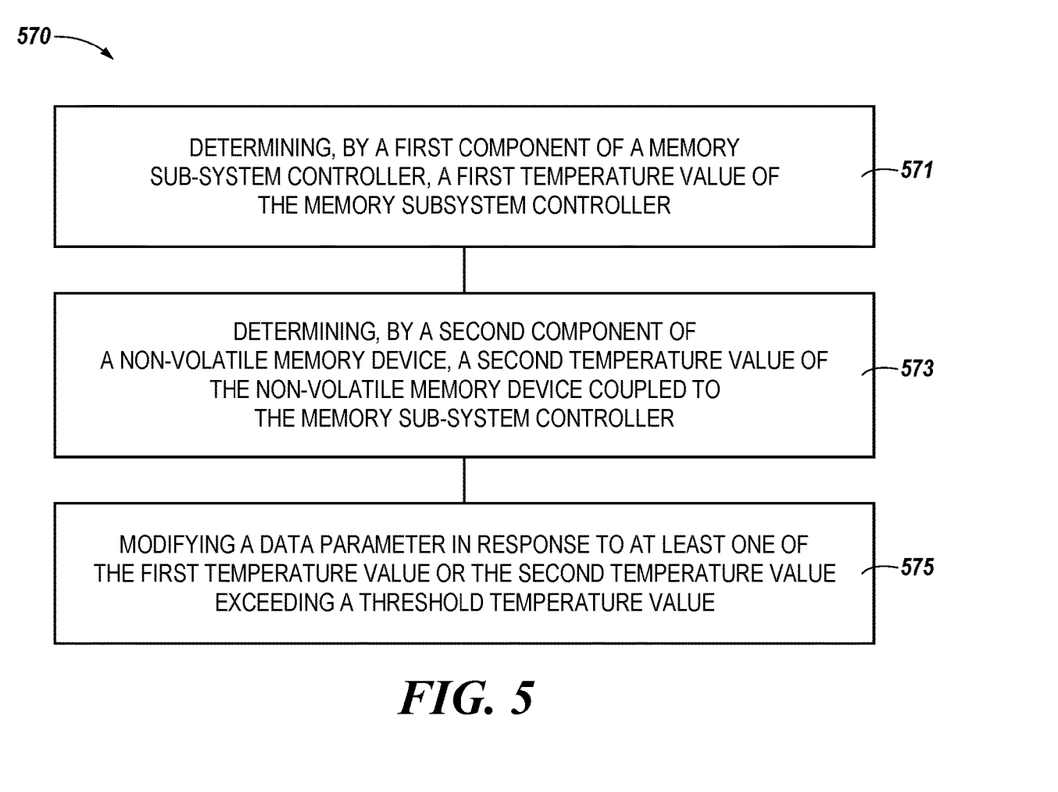
FIG. 5 is a flow diagram corresponding to a method for performing memory sub-system operations to regulate temperature in accordance with some embodiments of the present disclosure.

FIGS. 4A-5 each illustrate a flow diagram corresponding to a method 450, 460, 570 for performing memory sub-system operations to regulate temperature in accordance with some embodiments of the present disclosure. Each respective method 450, 460, 570 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, each method 450, 460, 570 is performed by the temperature component 113 or temperature component 131 of FIG. 1, the temperature component 213 or temperature component 231 of FIG. 2, and/or the temperature component 313 of FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 4A illustrates a flow diagram 450 corresponding to memory sub-system operations to regulate temperature in accordance with some embodiments of the present disclosure. At operation 451, the temperature component (e.g., temperature component 113, 131, 213, 231, 313, 331) can perform an initial temperature reading. The initial temperature reading can indicate a temperature of the controller (e.g., memory sub-system controller 115, 215, 315) obtained by a first temperature component (e.g., temperature component 113) or can indicate a temperature of the non-volatile memory device (e.g., memory device 130, 230) obtained by a second temperature component (e.g., temperature component 131). At operation 452, a data transfer rate can be set. In some embodiments, the data transfer rate can be set based on the initial temperature reading of the controller and/or the non-volatile memory device. In some embodiments, the data transfer rate can be set based on a pre-determined initial data transfer rate.

At operation 453, the data transfer can be started. As an example, data can be transferred from a volatile memory device (e.g., memory device 140, 240) to a non-volatile memory device (e.g., memory device 130, 230). The data transfer can be a save operation, a partial save operation. The data transfer can include a restore operation to restore data from the non-volatile memory device to the volatile memory device.

At operation 454, the temperature value of the controller and/or the non-volatile memory device can be checked by their corresponding temperature components and a subsequent temperature value can be obtained. At operation 455, the data transfer rate can be reset based on the checked temperature value. As an example, starting the data transfer can cause the temperature value of the controller to increase and be closer to a threshold temperature value. In response to this increase, the data transfer rate can be decreased in order to decrease the temperature value of the controller. Likewise, a temperature value of the non-volatile memory device can increase and the data transfer rate can be decreased in order to lower a temperature value corresponding to the non-volatile memory device.

As indicated by arrow 457, the data transfer rate can be reset and a subsequent temperature value checked for the controller or the non-volatile memory device in an iterative process or repetitively using a feedback loop or mechanism to dynamically adjust the transfer rate as the data is transferred until the data transfer is complete. In this way, the temperature value can be maintained below a threshold temperature value or within a range of temperature values. At operation 456, the data transfer can end or be completed. In some embodiments, the temperature value sensing or monitoring by the temperature component can be suspended until a subsequent data transfer is requested.

In some embodiments, the temperature values of both the controller and the non-volatile memory device can be used as a feedback mechanism to throttle a save/restore operation of the data by having a dynamic data transfer rate from the volatile memory device to the controller and then to the non-volatile memory device. In one example, the data transfer rate can be dynamically adjusted by adding a delay between smaller data units (e.g., a page, block, bank, DRAM, etc.) or by decreasing a speed of communication between the controller and the volatile memory device or the controller and the non-volatile memory device. In this way, performing a save/restore of the full data set to the non-volatile memory can allow the host to be unaware of any changes to the speed of the data transfer and without consideration to the memory space. Due to the varying time of operation that this may create, time of operation may be of less concern when performing a non-power failure operation.

FIG. 4B illustrates a flow diagram 460 corresponding to memory sub-system operations to regulate temperature in accordance with some embodiments of the present disclosure. At operation 461, the temperature component (e.g., temperature component 113, 131, 213, 231, 313, 331) can perform an initial temperature reading. The initial temperature reading can indicate a temperature of the controller (e.g., memory sub-system controller 115, 215, 315) obtained by a first temperature component (e.g., temperature component 113) or can indicate a temperature of the non-volatile memory device (e.g., memory device 130, 230) obtained by a second temperature component (e.g., temperature component 131). At operation 462, a data amount to be transferred can be set. In some embodiments, the data amount or data size can be set based on the initial temperature reading of the controller and/or the non-volatile memory device. In some embodiments, the data amount can be set based on a pre-determined initial data transfer amount.

At operation 463, the data transfer can be started. As an example, data can be transferred from a volatile memory device (e.g., memory device 140, 240) to a non-volatile memory device (e.g., memory device 130, 230). The data transfer can be a save operation or a partial save operation. The data transfer can include a restore operation to restore data from the non-volatile memory device to the volatile memory device.

At operation 464, the temperature value of the controller and/or the non-volatile memory device can be checked by their corresponding temperature components and a subsequent temperature value can be obtained. At operation 465, the data transfer amount can be reset based on the checked temperature value. As an example, starting the data transfer can cause the temperature value of the controller to increase and be closer to a threshold temperature value. In response to this increase, the data transfer amount can be decreased in order to decrease the temperature value of the controller. Likewise, a temperature value of the non-volatile memory device can increase and the data transfer amount can be decreased in order to lower a temperature value corresponding to the non-volatile memory device.

As indicated by arrow 467, the data transfer rate can be reset and a subsequent temperature value checked for the controller or the non-volatile memory device in an iterative process or repetitively using a feedback loop or mechanism to dynamically adjust the data transfer amount as the data is transferred until the data transfer is complete. In this way, the temperature value can be maintained below a threshold temperature value or within a range of temperature values. At operation 466, the data transfer can end or be completed. In some embodiments, the temperature value sensing or monitoring by the temperature component can be suspended until a subsequent data transfer is requested.

In some embodiments, the temperature values of both the controller and the non-volatile memory device can be used as a feedback mechanism to throttle a save/restore operation of the data by having a dynamic data transfer rate from the volatile memory device to the controller and then to the non-volatile memory device. In one example, the data transfer amount can include having a dynamic memory capacity for a save/restore operation on the data. Rather than having a static amount of data (e.g., a full or partial capacity of the volatile memory space), be transferred to the non-volatile memory device, the amount of data can be dynamic and determined by the current temperature value of the controller, current temperature value of the non-volatile memory device, and/or user inputs such as a minimum, maximum, start of memory space to save, or end of memory space to save. In this way, a predictable and user-determined maximum time of operation can be used. This method may be used when the host is interested in only doing a partial save/restore operation and a minimum capacity is set or the host implements a priority memory space.

In some embodiments, a combination of both adjusting data transfer rates and data transfer amounts can be used in order to dynamically affect the temperatures of both the controller and the non-volatile memory device. For example, the data transfer rate can be decreased while also decreasing an amount of data to be transferred in order to decrease a temperature value of at least one of the controller and the non-volatile memory, and vice versa.

FIG. 5 is a flow diagram corresponding to a method 570 for performing memory sub-system operations to regulate temperature in accordance with some embodiments of the present disclosure. The method 570 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. At operation 571, the method 570 can include determining, by a first component of a memory sub-system controller, a first temperature value of the memory sub-system controller. The component can be analogous to the temperature component 113 of FIG. 1, the temperature component 213 of FIG. 2, and/or the temperature component 313 of FIG. 3, and the memory sub-system controller can be analogous to the memory sub-system controller 115 of FIG. 1, the memory sub-system controller 215 of FIG. 2, and/or the memory sub-system controller 315 of FIG. 3. As described above, the temperature values can be sensed and/or monitored by the component and allow the component to adjust a data parameter.

At operation 573, the method 570 can include determining, by a second component of a non-volatile memory device, a second temperature value of the non-volatile memory device coupled to the memory sub-system controller. The memory device can be analogous to the memory device 130 and/or the memory device 140 of FIG. 1, and/or the memory device 230 and/or the memory device 240 of FIG. 2.

At operation 575, the method 570 can include modifying a data parameter in response to at least one of the first temperature value and the second temperature value exceeding a threshold temperature value. The data parameter can include a data size to be transferred, a data transfer speed, etc. As described above, the data can be written to the memory device as part of a save operation or as part of a partial save operation performed by a memory sub-system, such as the memory sub-system 110 illustrated in FIG. 1. In some embodiments, a data path between the memory elements can be reserved for transferring of data between a host coupleable to the memory sub-system controller and the non-volatile memory device prior to the data transfer occurring or dynamically while the data is being transferred, as described above.

In some embodiments, the memory device can be a volatile memory device and the memory device different than the memory device can be a non-volatile memory device (or vice versa). For example, the memory device can be a system memory device, such as a DRAM (e.g., a dual-ported RAM) memory device, and the memory device different than the memory device can be a storage device, such as a NAND memory device, a three-dimensional cross-point memory device, or other non-volatile memory device.

Figure 6:
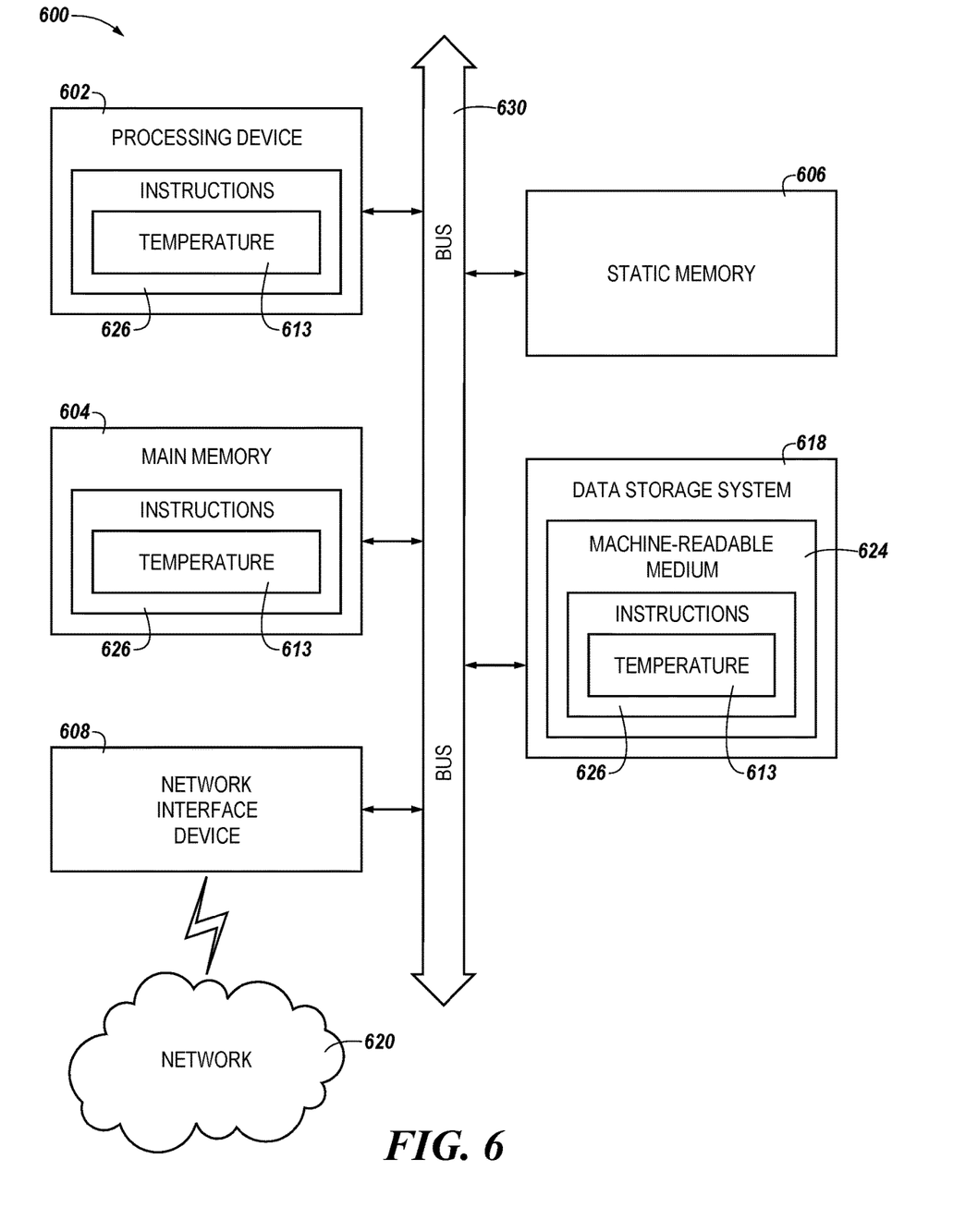
FIG. 6 is a block diagram of an example computer system in which embodiments of the present disclosure may operate.

The method 570 can further include modifying a transfer speed of data associated with transferring the data from a volatile memory device to the memory sub-system controller and from the controller to the non-volatile memory device. The volatile memory device can be coupled to the memory sub-system controller. The method 570 can further include adding a delay between sent portions of the data. The transferred data can be a full set of the data or can be a partial set of the data. A data parameter can be modified by limiting a quantity of data transferred to the non-volatile memory device. The quantity of the data can be limited based on one of the first temperature value and the second temperature value. The quantity of the data can be limited based on one of a number of user inputs. The number of user inputs can include a minimum, a maximum, a start of memory space to be saved, and an end of the memory space to be saved. The method 570 can further include determining the second temperature value of a NAND memory device. The method can further include FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the temperature component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620. In some embodiments, the main memory 604 or system 618 can be an NVDIMM such as is described in association with FIGS. 2-3.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a memory block grading and allocation component (e.g., the temperature component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   determining, by a first component of a memory sub-system controller, a first temperature value of the memory subsystem controller;
   determining, by a second component of a non-volatile memory device, a second temperature value of the non-volatile memory device coupled to the memory sub-system controller;
   performing a full save operation in response to:
      the first temperature value being below a first threshold temperature value; or
      the second temperature value being below a second threshold temperature value;
      wherein:
         performing the full save operation comprises saving a full set of data; and
         performing the partial save operation comprises saving a portion of the full set of data and not saving other portions of the full set of data; and
   modifying a data parameter in response to:
      the first temperature value exceeding the first threshold temperature value; or
      the second temperature value exceeding the second threshold temperature value; or
      both.

2. The method of claim 1, wherein modifying the data parameter comprises modifying a transfer speed of data associated with transferring the data from a volatile memory device to the memory sub-system controller and from the controller to the non-volatile memory device.

3. The method of claim 2, wherein modifying the transfer speed of the data comprises adding a delay between sent portions of the data.

4. The method of claim 2, wherein the transferred data is a complete set of data associated with a particular write operation.

5. The method of claim 1, wherein modifying the data parameter comprises limiting a quantity of data transferred to the non-volatile memory device.

6. The method of claim 5, wherein the quantity of the data is limited based on at least one of the first temperature value and the second temperature value.

7. The method of claim 5, wherein the quantity of the data is limited based on a number of user inputs.

8. The method of claim 7, wherein the number of user inputs comprise a minimum time of operation value, a maximum time of operation value, a location in memory where the full save operation starts, and a location in the non-volatile memory device where the full save operation ends.

9. The method of claim 1, wherein the data parameter is an amount of data to be transferred and the amount of data is lowered until the at least one of the first temperature value and the second temperature value is below the first threshold temperature value or the second threshold temperature value, or both, respectively.

10. A system, comprising:
    a first memory device comprising a first temperature component;
    a second memory device; and
    a memory sub-system controller coupled to the first memory device and the second memory device and comprising a second temperature component, the memory sub-system controller to perform operations comprising:
       determining, by the first temperature component, a first temperature value of the first memory device;
       determining, by the second temperature component, a second temperature value of the memory sub-system controller;
       performing a partial save operation in response to:
          the first temperature value exceeding a first threshold temperature value; or
          the second temperature value exceeding a second threshold temperature value;
          wherein:
             performing the partial save operation comprises saving a portion of the full set of data and not saving other portions of the full set of data; and
             performing the full save operation comprises saving the full set of data; and
       modifying a data transfer rate in response to:
          the first temperature value exceeding the first threshold temperature value; or
          the second temperature value exceeding the second threshold temperature value; or
          both.

11. The system of claim 10, wherein the memory sub-system controller is to perform operations comprising decreasing the data transfer rate.

12. The system of claim 11, wherein the memory sub-system controller is to perform operations comprising:
    determining a subsequent first temperature value of the first memory device and a subsequent second temperature value of the memory sub-system controller; and
    decreasing the data transfer rate until at least one of the subsequent first temperature value and the subsequent second temperature value is below a third threshold temperature value, a fourth threshold temperature value, respectively, or both.

13. The system of claim 10, wherein the memory sub-system controller is to perform operations comprising adding a time delay between portions of data transferred between the first memory device and the memory sub-system controller.

14. The system of claim 13, wherein the memory sub-system controller is to perform operations comprising:
   determining a subsequent first temperature value of the first memory device and a subsequent second temperature value of the second memory device; and
   increasing the time delay between the portions of data transferred until at least one of the subsequent first temperature value or the subsequent second temperature value is below a third threshold temperature value, a fourth threshold temperature value, respectively, or both.

15. The system of claim 10, wherein one of the first memory device or the second memory device comprises a volatile memory device, and wherein the other of the first memory device or the second memory device comprises a non-volatile memory device.

16. The system of claim 10, wherein the memory sub-system controller is configured to perform operations comprising:
   generating an indication in response to at least one of the first temperature value or the second temperature value exceeding the first threshold temperature value or the second threshold temperature value, respectively.

17. A system, comprising:
   a memory sub-system controller of a non-volatile dual in-line memory module (NVDIMM);
   a first memory device of the NVDIMM coupled to the memory sub-system controller and comprising a first temperature component; and
   a second memory device of the NVDIMM coupled to the memory subsystem controller;
   wherein the memory sub-system comprises a second temperature component and is configured to:
      determine, by the first temperature component, a first temperature value of the first memory device;
      determine, by the second temperature component, a second temperature value of the memory sub-system controller; and
   setting an amount of data to be transferred for a full save operation; and
   performing a partial save operation in response to:
      the first temperature value exceeding a first threshold temperature value; and
      the second temperature value exceeding a second threshold temperature value; and
   performing a full save operation in response to:
      the first temperature value being below the first threshold temperature value; and
      the second temperature value being below the second threshold temperature value;
   wherein:
      performing the full save operation comprises saving a full set of data; and
      performing the partial save operation comprises saving a portion of the full set of data and not saving other portions of the full set of data.

18. The system of claim 17, wherein the memory-sub-system controller is configured to perform one of the full save operation using the set amount of data or the partial save operation using the portion of the amount of data to be transferred.

19. The system of claim 18, wherein the memory-sub-system controller is configured to:
   perform the full save operation in response to the first temperature value or the second temperature value being below the first threshold temperature value or below the second threshold temperature value, respectively.

20. The system of claim 17, wherein the memory sub-system controller, the first memory device and the second memory device are part of an application-specific integrated circuit or a field-programmable gate array.

* * * * *